J. F. HERBERT, Jr.
OCULIST'S INSTRUMENT.
APPLICATION FILED DEC. 19, 1916.
1,235,474.
Patented July 31, 1917.
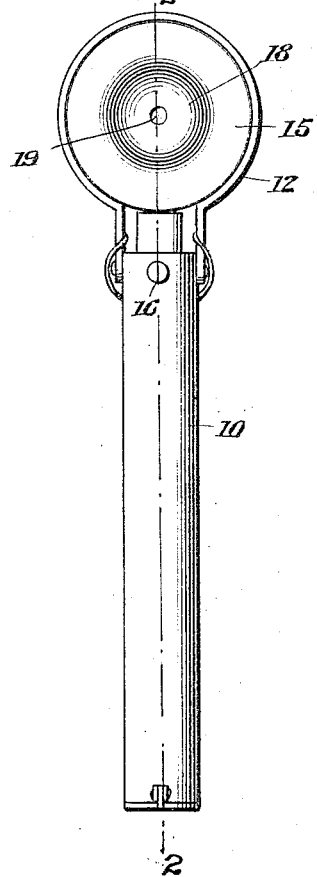
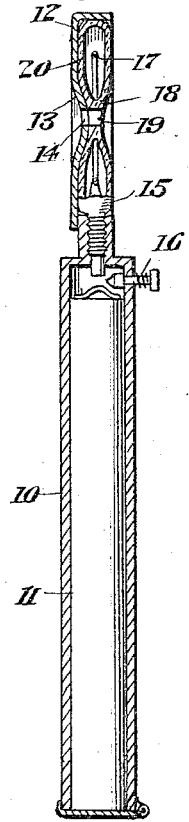
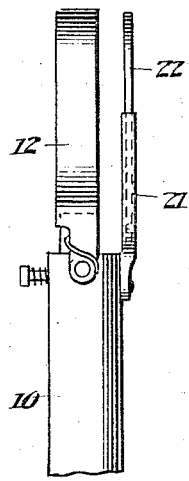
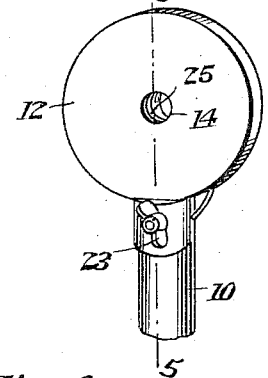
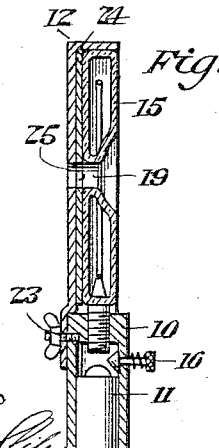
Inventor
J. Frederick Herbert Jr.
By Victor J. Evans
Attorney
Witnesses

UNITED STATES PATENT OFFICE.

JOHN FREDK. HERBERT, JR., OF PHILADELPHIA, PENNSYLVANIA.

OCULIST'S INSTRUMENT.

1,235,474. Specification of Letters Patent. Patented July 31, 1917.

Application filed December 19, 1916. Serial No. 137,887.

*To all whom it may concern:*

Be it known that I, JOHN FREDERICK HERBERT, Jr., a citizen of the United States, residing at 810–12 Flanders Bldg., 15th & Walnut streets, Philadelphia, in the county of Philadelphia and State of Pennsylvania, have invented new and useful Improvements in Oculists' Instruments, of which the following is a specification.

The invention relates to optics and more particularly to instruments relating to the projection and reflection of light rays in a particular manner, and in a particular direction for the purpose of directly illuminating another surface or object, and to this end an object of the invention is to provide an instrument for projecting light rays in a particular direction upon an object to be illuminated.

More specifically the invention relates to devices such as ophthalmoscopes, retinoscopes, skiascopes or the like, and therefore, in the use of instruments of this kind the invention comprehends an ophthalmoscope which carries its own light or source of illumination, and reflects same into the eye without, however, disturbing to any extent the vision of the patient, or causing unnecessary blinking of the eye while under examination, the object being to illuminate the retina of the eye to permit of a minute examination of parts that may or may not be irritated, diseased, or in some abnormal condition.

I am aware that ophthalmoscopes and retinoscopes have been used heretofore, but in a large number of these instruments the source of illumination is an exterior one, and when artificial is objectionable in many ways, particularly in the character of reflection when the distance that the instrument is held from the eye is taken into consideration. I aim to provide a device having its own source of illumination, and arranged and constructed in a simple and practical manner, whereby an efficient examination of the eye can be made, and the device held at the required distance to permit of effectively surveying the parts under examination. To this end I desire that instead of having a source of light thrown upon a mirror and in turn reflected upon the object to be examined, the operator gaze through a loop of light which is so disposed that the light will radiate from a reflecting surface in juxtaposition to the loop of light, and not interfere with the vision of the operator, or unduly affect the patient or object to be viewed.

In the further disclosure of the invention, reference is to be had to the accompanying drawings, forming a part of this specification, in which similar characters of reference denote corresponding parts in all the views, and in which—

Figure 1 is a fragmentary front elevation of a form of my invention.

Fig. 2 is a vertical section taken on line 2—2 of Fig. 1.

Fig. 3 is a side elevation of a somewhat modified form of the device.

Fig. 4 is a fragmentary perspective view of still another modified form.

Fig. 5 is a sectional view taken on line 5—5 of Fig. 4.

Fig. 6 shows several sectional views taken through different forms of incandescent globes used in connection with my device.

Referring to the views and more particularly to Figs. 1 and 2, I provide a handle 10 of the nature of a casing, in which is disposed one of the usual dry cells 11, of any standard make or form, and well known on the commercial market. Pivoted on the upper end of the handle 10 is a disk-like casing 12 which it will be seen can be swung from a horizontal to a vertical position, and vice versa, and it is preferably formed at its center with an indented portion 13, having an aperture 14 therein. An incandescent bulb 15 is screwed into the upper end of the handle 10, and a suitable contact button 16, of any desired form, is mounted upon the casing to close a circuit from the battery 11 to the bulb 15, so as to illuminate the bulb upon the closing of the circuit.

The bulb 15 is preferably circular in shape and somewhat flat at the sides, and has an incandescent wire or loop 17 circular in shape, as shown, with the central portion of the bulb indented as at 18, and if desirable, formed with an aperture 19. A face 20 of the bulb may be frosted to provide a light-diffusing surface in order that the light from the incandescent loop 17 will be diffused or disseminated, it being understood that the operator gazes through the aperture 14, and also the aperture 19, they being in registration, so as to gaze into the eye of the patient, the parts of the eye being illuminated by the diffused light from the incandescent loop 17, which is diffused by the frosted surface 20. Thus it will be seen that the operator gazes through the center of an incandescent loop without having the light from the same interfering with his vision. If desirable the inner face of the casing 12 may be frosted or provided with a mirror in order to diffuse and properly deflect the diffused light to the object under examination, and thus it will be apparent that various forms and shapes of incandescent bulbs may be employed to effect the desired result. As shown in Fig. 6 the bulb designated *a* is of a plano-parallel nature, whereas, the one designated *b* is plano-concave, the one designated *c* being convexo-concave, and it will be clear that the bulbs may or may not be provided with a central aperture as indicated in Fig. 2 by the numeral 19.

In Fig. 3 I show a simple modified form of my invention and in which instance I have provided a holder 21 upon the handle 10, the holder 21 being of a semi-circular shape to receive and support a lens 22 that may be colored or tinted to a certain shade in order to adjust the reflected rays of light to the weak eyes of the patient so that the eye will not be subjected to too intense an illumination, which might cause irritation and annoyance while the eye of the patient is under examination.

In Figs. 4 and 5 it will be seen that the casing 12 instead of being pivoted upon the handle 10 is attached thereto by a suitable clamp 23, and that in this instance there is interposed between the casing and the incandescent bulb 15, a disk or other suitable light-diffusing surface element 24, provided with a central aperture 25 registering with the aperture 14 of the casing 12, and with the aperture 19 in the incandescent bulb, in the event that the latter is used with an aperture, although as mentioned heretofore the incandescent bulbs shown may be of any desired shape, style and form, with or without an aperture as desired.

From the foregoing it will be seen that while the instrument described and various forms thereof, is primarily designed for use in the examination of an eye, on the principle of the ophthalmoscope, a device of this character, has a broader application in that it may be employed in any instrument of observation to illuminate an object wherein in order to observe returning rays of light, the eye of the observer must be placed as close as possible in the direct line of vision between the source of illumination and the object to be viewed, and at the same time be protected from the source of light without obstructing the field illuminated for observation. To this end the device may be used by dentists, and surgeons, for the purpose of examining the interior of hollow objects, cavities, depressions, passages and the like.

As mentioned heretofore in the use of retinoscopes and ophthalmoscopes the source of light has been reflected from a mirror, and in some instances the refraction of the source of light through a prism has been employed, to illuminate the object. Further use has been made of what is known as direct illumination, or by a shaded electric light, for the purpose of accomplishing the desired result, namely, the proper illumination of the object without annoyance to the operator by the source of light used for the illumination. With my device I attain all of the objects necessary to provide an effective instrument, simple and convenient, providing a direct illumination; unobstructed range of vision; close proximity or contact with the object to be viewed; protection to the eye of the observer, and a larger field of illumination and a more intense light, although the same is evenly diffused and distributed by means of the diffusing surface employed as has been stated, or modified by interposing colored slides.

The device described may be used for various other purposes, and is not designed entirely for use in optics when related solely to the examination of the eye, but it may be used for mechanical purposes as in automobile headlights and the like, and it will be clearly understood that I do not limit myself to the particular description herein and the disclosure in the drawings, and that the scope of the invention is defined by the appended claims.

Having described my invention I claim—

1. A device of the character described, comprising a handle, a battery in the handle, an incandescent bulb supported in the handle and having contact with said battery for illuminating the bulb, said bulb having a centrally disposed transparent portion, and a casing provided with an aperture and disposed adjacent to the bulb with the aperature of the casing in registration with the transparent portion of the bulb.

2. A device of the character described, comprising a handle, an incandescent bulb on the handle, and having a central transparent portion and a casing disposed adjacent to the bulb, and provided with an aperture in registration with the transparent portion of the bulb, and an interposed opaque light-diffusing surface, having a transparent portion in registration with the aperture of the casing and the transparent portion of the bulb.

3. A device of the character described, comprising a bulb having a circular incandescent loop therein, with the central portion of said bulb transparent, and a juxtaposed casing formed with a central aperture in registration with the transparent portion of said bulb.

4. A device for illuminating an object within a range of vision without interfering with the view, comprising an incandescent loop, and a viewing screen interposed between the loop and the range of vision to preclude the interference of the direct light from the illuminant with the vision.

5. A device for illuminating an object within a range of vision, comprising an incandescent loop and an apertured opaque screen element disposed to have the aperture thereof in line with the theoretical center of the loop to prevent the direct rays of light from the loop from interfering with the range of vision through the said aperture.

6. A device for illuminating an object within a range of vision, comprising an incandescent loop and an apertured opaque screen element disposed to have the aperture thereof in line with the theoretical center of the loop to prevent the direct rays of light from the loop from interfering with the range of vision through the said aperture, and a light-diffusing surface interposed between the screen element and the incandescent loop to diffuse the direct rays of light to refract the same onto the object to be viewed.

In testimony whereof I affix my signature.

J. FREDK. HERBERT, Jr.

Copies of this patent may be obtained for five cents each, by addressing the "Commissioner of Patents, Washington, D. C."